United States Patent
Harris, Jr. et al.

(10) Patent No.: US 9,632,716 B1
(45) Date of Patent: Apr. 25, 2017

(54) METHOD, SYSTEM, AND COMPUTER PROGRAM PRODUCT FOR CONSISTENT ASYNCHRONOUS REPLICATION OF LOCAL BACKUP

(71) Applicant: INTERNATIONAL BUSINESS MACHINES CORPORATION, Armonk, NY (US)

(72) Inventors: Theodore T. Harris, Jr., Tucson, AZ (US); Brian A. Rinaldi, Tucson, AZ (US); Paul G. Spagnolo, Omaha, NE (US); Matthew J. Ward, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/995,118

(22) Filed: Jan. 13, 2016

(51) Int. Cl.
  *G06F 12/00* (2006.01)
  *G06F 3/06* (2006.01)

(52) U.S. Cl.
  CPC .......... *G06F 3/0619* (2013.01); *G06F 3/065* (2013.01); *G06F 3/0683* (2013.01)

(58) Field of Classification Search
  CPC .......... H04L 29/0854; G06F 11/1456; G06F 17/30578; G06F 17/30067
  See application file for complete search history.

(56) References Cited

U.S. PATENT DOCUMENTS

| | | | |
|---|---|---|---|
| 7,991,972 B2 | 8/2011 | Benhase et al. | |
| 8,250,323 B2 | 8/2012 | Benhase et al. | |
| 9,081,842 B1 | 7/2015 | Natanzon et al. | |
| 2007/0156983 A1* | 7/2007 | Kern | G06F 11/2064 711/162 |
| 2012/0079224 A1* | 3/2012 | Clayton | G06F 11/1456 711/162 |
| 2012/0254114 A1* | 10/2012 | Gundy | G06F 17/30088 707/639 |
| 2014/0108349 A1* | 4/2014 | Benhase | G06F 17/30575 707/639 |

FOREIGN PATENT DOCUMENTS

CN 103019890 4/2015

OTHER PUBLICATIONS

Westphal et al., IBM System Storage DS8000: Architecture and Implementation, IBM Redbooks, Nov. 16, 2012.*
English translation of CN103019890 filed Apr. 29, 2015 by UNIV TSINGHUA.

* cited by examiner

*Primary Examiner* — Ryan Bertram
*Assistant Examiner* — Trang Ta
(74) *Attorney, Agent, or Firm* — Rabindranath Dutta; Konrad Raynes Davda & Victor LLP

(57) ABSTRACT

A first asynchronous mirroring session is initiated to asynchronously copy first primary volumes to first secondary volumes. Point in time copy operations generate a local backup copy from the first primary volumes. Second primary volumes are generated from the local backup copy. A second asynchronous mirroring session is initiated to asynchronously copy the second primary volumes to second secondary volumes.

18 Claims, 9 Drawing Sheets

METHOD, SYSTEM, AND COMPUTER PROGRAM PRODUCT FOR CONSISTENT ASYNCHRONOUS REPLICATION OF LOCAL BACKUP

BACKGROUND

1. Field

Embodiments relate to a method, system, and computer program product for consistent asynchronous replication of local backup.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

In many systems, data on one storage device may be copied to the same or another storage device so that access to data volumes may be provided from two different locations. The copying of a data set from a source volume to a target volume may be performed synchronously or asynchronously. In synchronous copy unless an acknowledgement is received that the data set has been written to the target volume, the host waits for the synchronous copy operation initiated by the host to complete, whereas in asynchronous copy the host does not have to wait for the asynchronous copy operation initiated by the host to complete.

Point in time copy allows creation of instantaneous, point in time snapshot copies of entire logical volumes or data sets. A point in time copy may involve physically copying all the data from source volumes to target volumes so that the target volume has a copy of the data as of a point in time. A point in time copy can also be made by logically making a copy of the data and then only copying data over when necessary. Certain storage subsystems are capable of performing "instant virtual copy" operations, also referred to as "fast replicate functions." Instant virtual copy operations function by modifying metadata such as relationship tables or pointers to treat a source data object as both the original and copy. In response to a copy request from a host, the storage controller substantially immediately reports creation of the copy without having made any physical copy of the data. Only a "virtual" copy is created, and the absence of an additional physical copy is completely unknown to the host. A nocopy option for a point in time copy may perform a point in time copy without actually making a second copy of a dataset via some of the mechanisms described above or via other mechanisms.

When an application has one write that is dependent on the completion of another write, the application is said to have dependent writes. Using dependent writes, applications may manage the consistency of their data, so that a consistent state of the application data on storage devices is maintained, in the event of a failure in the host or the storage controller.

To maintain the consistency of data across multiple storage volumes at a remote backup location, certain storage controllers support the concept of a consistency group. Storage volumes in a copy relationship that are configured into a consistency group are maintained to ensure that a group of dependent updates made to the storage volumes at the primary location are made together as a unit on the storage volumes at the remote backup location to maintain data consistency.

Asynchronous remote copy is a mechanism that provides data replication over extended distances between two sites for business continuity, disaster recovery, and for other reasons. Asynchronous remote copy replicates the data asynchronously from a local site to a remote site.

SUMMARY OF THE PREFERRED EMBODIMENTS

Provided are a method, a system, and a computer program product in which a first asynchronous mirroring session is initiated to asynchronously copy first primary volumes to first secondary volumes. Point in time copy operations generate a local backup copy from the first primary volumes. Second primary volumes are generated from the local backup copy. A second asynchronous mirroring session is initiated to asynchronously copy the second primary volumes to second secondary volumes.

In additional embodiments, the first primary volumes and the second primary volumes are maintained at a local site, the first secondary volumes and the second secondary volumes are maintained at a remote site, and the local backup copy is maintained at the local site.

In yet additional embodiments, the second asynchronous mirroring session copies the second primary volumes consistently to the second secondary volumes In further embodiments, the first asynchronous mirroring session copies the first primary volume consistently to the second secondary volumes, wherein the first asynchronous mirroring session and the second asynchronous mirroring session execute operations in parallel.

In certain embodiments, in response to determining that the local backup copy from the first primary volumes has been created, polling is performed for a number of consistency groups formed in the second asynchronous mirroring session. In response to at least two consistency groups being formed in the second asynchronous mirroring session, a determination is made that the local backup copy is available on the second secondary volumes.

In further embodiments, in response to determining that a time of creation of a consistency group in the second asynchronous mirroring session is later than a time of creation of the local backup copy via the point in time copy operations, a determination is made that the local backup copy is available on the second secondary volumes.

In certain embodiments, the first asynchronous mirroring session asynchronously copies first primary volumes stored at a local site to a remote site into first secondary volumes. The second asynchronous mirroring session asynchronously copies second primary volumes stored at the local site to the remote site into second secondary volumes. One or more applications use the local backup copy for performing operations at the local site.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In many situations, user may prefer to make local backup copies of data that is being replicated asynchronously over a long distance from a local site to a remote site via an asynchronous mirroring session. Often these local backup copies are generated before or after a significant job is initiated by a host. If a problem occurs in the replication via the asynchronous mirroring session, the user may perform a recovery from the local backup copy to continue the job, and operations in the job may have to be executed once again only from the point at which the local backup copy was last generated at the local site.

The local backup copy that may be used for execution of operations in the job at the local site is not replicated via the asynchronous mirroring session. However, the user may prefer that the local backup copy be available in a consistent manner on the remote site. Certain embodiments use a point in time copy, a utility application, and an additional asynchronous mirroring session to replicate the local backup copy consistently to the remote site that is at an extended distance from the local site.

Exemplary Embodiments

Figure 1:
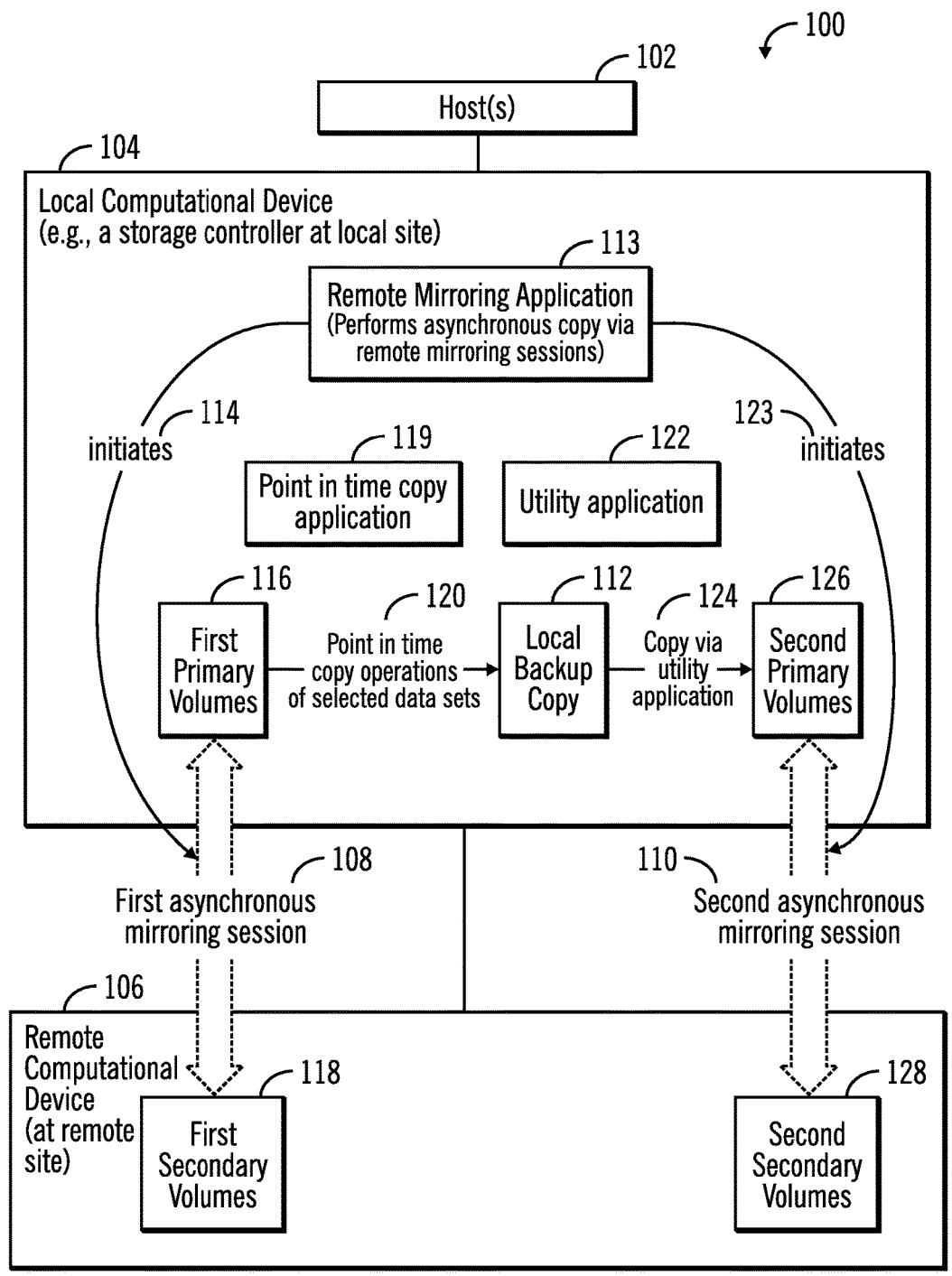
FIG. 1 illustrates a block diagram of a computing environment comprising a host, a local computational device at a local site, and a remote computational device at a remote site, where in addition to an already initiated first asynchronous mirroring session, a second asynchronous mirroring session is started to handle local backup copies, in accordance with certain embodiments.

FIG. 1 illustrates a block diagram of a computing environment 100 comprising one or more hosts 102, a local computational device 104 at a local site, and a remote computational device 106 at a remote site, where in addition to an already initiated first asynchronous mirroring session 108, a second asynchronous mirroring session 110 is started to handle local backup copies 112, in accordance with certain embodiments.

The host 102, the local computational device 104, and the remote computational device 106 may comprise any suitable computational device including those presently known in the art, such as, a personal computer, a workstation, a server, a mainframe, a hand held computer, a palm top computer, a telephony device, a network appliance, a blade computer, a processing device, etc. The host 102, the local computational device 104 and the remote computational device 106 may be elements in any suitable network, such as, a storage area network, a wide area network, the Internet, an intranet, etc. In certain embodiments. In certain embodiments, the host 102, the local computational device 104 and the remote computational device 106 may be elements in a cloud computing environment. The local computational device 104 may be separated from the remote computational device 106 by an extended distance (e.g., over 5 kilometers). The host 102, the local computational device 104, and the remote computational device 106 may each be comprised of one or more computational devices.

In certain embodiments, the local computational device 104 may comprise a storage controller at the local site, where the local computational device 104 may control storage devices and allow one or more of the hosts 102 to perform input/output (I/O) operations on logical storage volumes maintained by the local computational device 104, and where the local computational device 102 also maintains physical storage volumes corresponding to the logical storage volumes in the storage devices controlled by the local computational device 104.

The logical storage volumes maintained by the local computational device 104 at the local site may be referred to as primary volumes, and logical storage volumes maintained by the remote computational device 106 are referred to as secondary volumes. A remote mirroring application 113 that executes in the local computational device 104 may initiate (reference numeral 114) the first asynchronous mirroring session 108. The first asynchronous mirroring session 108 asynchronously starts copying a first set to primarily volumes (referred to a first primary volumes 116) to the remote computational device 106, where the remote computational device 106 maintains the asynchronous copes in logical storage volumes, referred to as first secondary volumes 118.

In many embodiments, a user in the host 102, may request the local computational device 104 to create a local backup copy 112 of some data sets of the first primary volumes 116, and the user may execute jobs by using the local backup copy 112. While jobs are being executed by using the local backup copy 112, at the same time the first primary volumes 116 are being asynchronously copied to the first secondary volumes 118 via the first asynchronous mirroring session 108.

It should be noted that the first secondary volumes 118 no longer reflect the updates made in the local backup copy 112. However, users may also prefer to replicate the local backup copy 112 consistently in the remote site, such that in the event of a failure in the local computational device 104, the copies stored in the remote site may be retrieved for usage.

In certain embodiments, a point in time copy application 119 that executes in the local computational device 104 is used by the host 102 to create a point in time copy of selected data sets (e.g., data sets selected by a user that uses a host application in the host 102) in the first primary volumes 116, where the point in time copy of the selected data sets are referred to as the local backup copy 112. The point in time copy operations on the selected data sets are shown via reference numeral 120.

The host 102 may use the local backup copy 112 in jobs executed by the host 102. However, the user who executes jobs in the host 102 may prefer to have the local backup copy 112 copied to the remote computational device 106, because the changes made to the local backup copy 112 by the jobs are not reflected in the first secondary volumes 118 being generated by the first asynchronous mirroring session 108.

In order to ensure that the local backup copy 112 is also replicated to the remote computational device 112, the remote mirroring application 113 initiates (reference numeral 123) a second asynchronous mirroring session 110. The utility application 122 copies (shown via reference numeral 124) the local backup copy 112 to second primary volumes 126 and the second asynchronous mirroring session 110 copies the second primary volumes 126 to generate second secondary volumes 128 at the remote computational device 106. It should be noted that the second asynchronous mirroring session 110 ensures that consistent copies are created during the second asynchronous mirroring session 110.

Therefore, FIG. 1 illustrates certain embodiments in which by initiating a second asynchronous mirroring session, local backup copies are replicated consistently at a remote site, while at the same time a first asynchronous mirroring session is copying volumes from the local site to the remote site.

Figure 2:
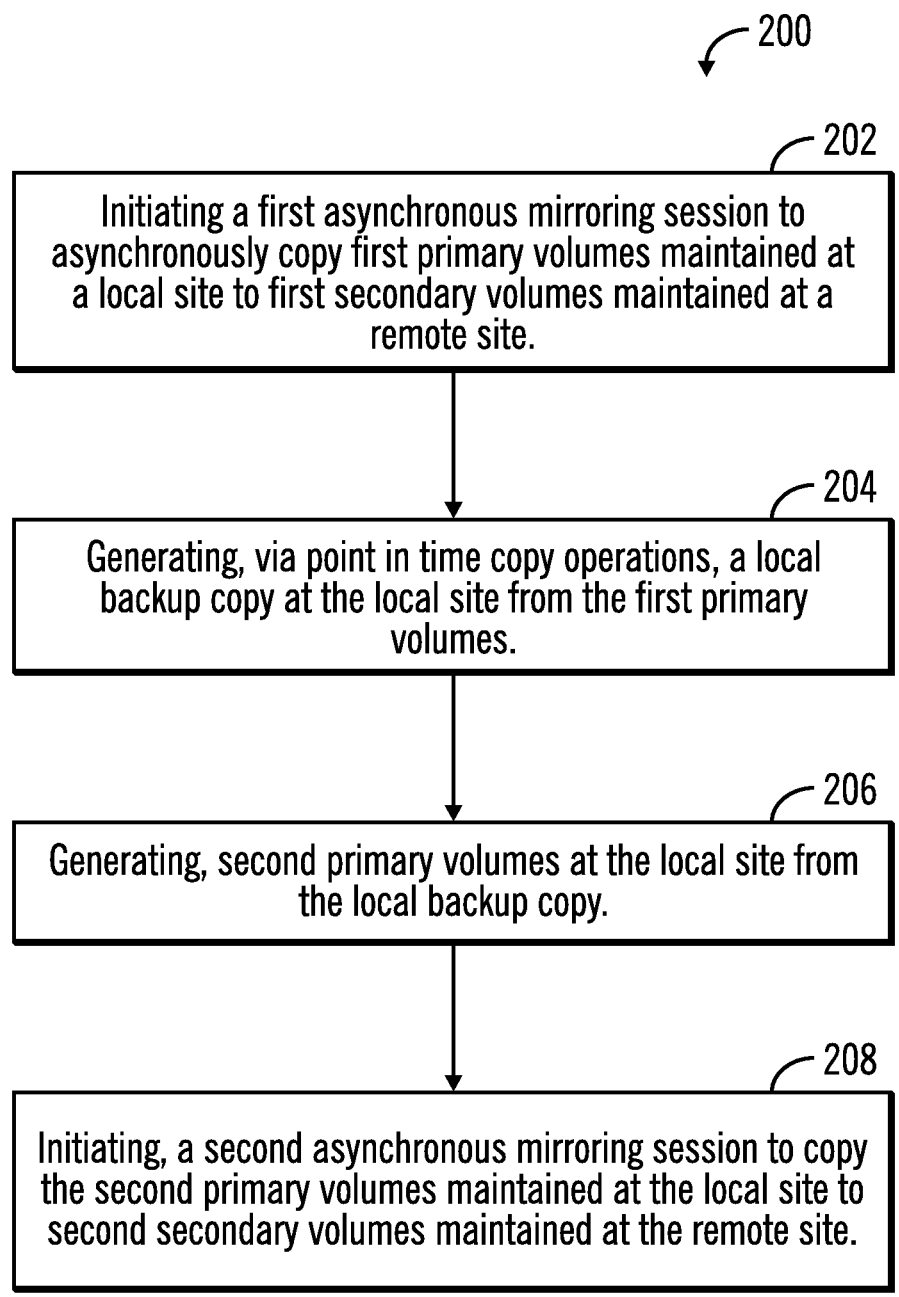
FIG. 2 illustrates a flowchart that shows operations performed for asynchronous mirroring of a local backup, in accordance with certain embodiments.

FIG. 2 illustrates a flowchart 200 that shows operations performed for asynchronous mirroring of a local backup copy 112, in accordance with certain embodiments. The operations shown in FIG. 2 may be performed by one or more applications that execute in the local computational device 104 that may comprise a storage controller.

Control starts at block 202 in which a first asynchronous mirroring session 108 is initiated to asynchronously copy first primary volumes 116 maintained at a local site, to first secondary volumes 118 maintained at a remote site.

In parallel to the operations shown in block 202, point in time copy operations 120 are used to generate (at block 204), a local backup copy 112 at the local site from the data sets selected from the first primary volumes 116.

Control proceeds to block 206 in which second primary volumes 126 are generated by the utility application 122 at the local site from the local backup copy 112. A second asynchronous mirroring session 110 is initiated (at block 208) to copy the second primary volumes 126 maintained at the local site to second secondary volumes 128 maintained at the remote site.

Therefore, FIG. 2 illustrates certain embodiments to initiate an additional synchronous mirroring session 110 to create consistent copies of the local backup copy 112 at a remote site.

Figure 3:
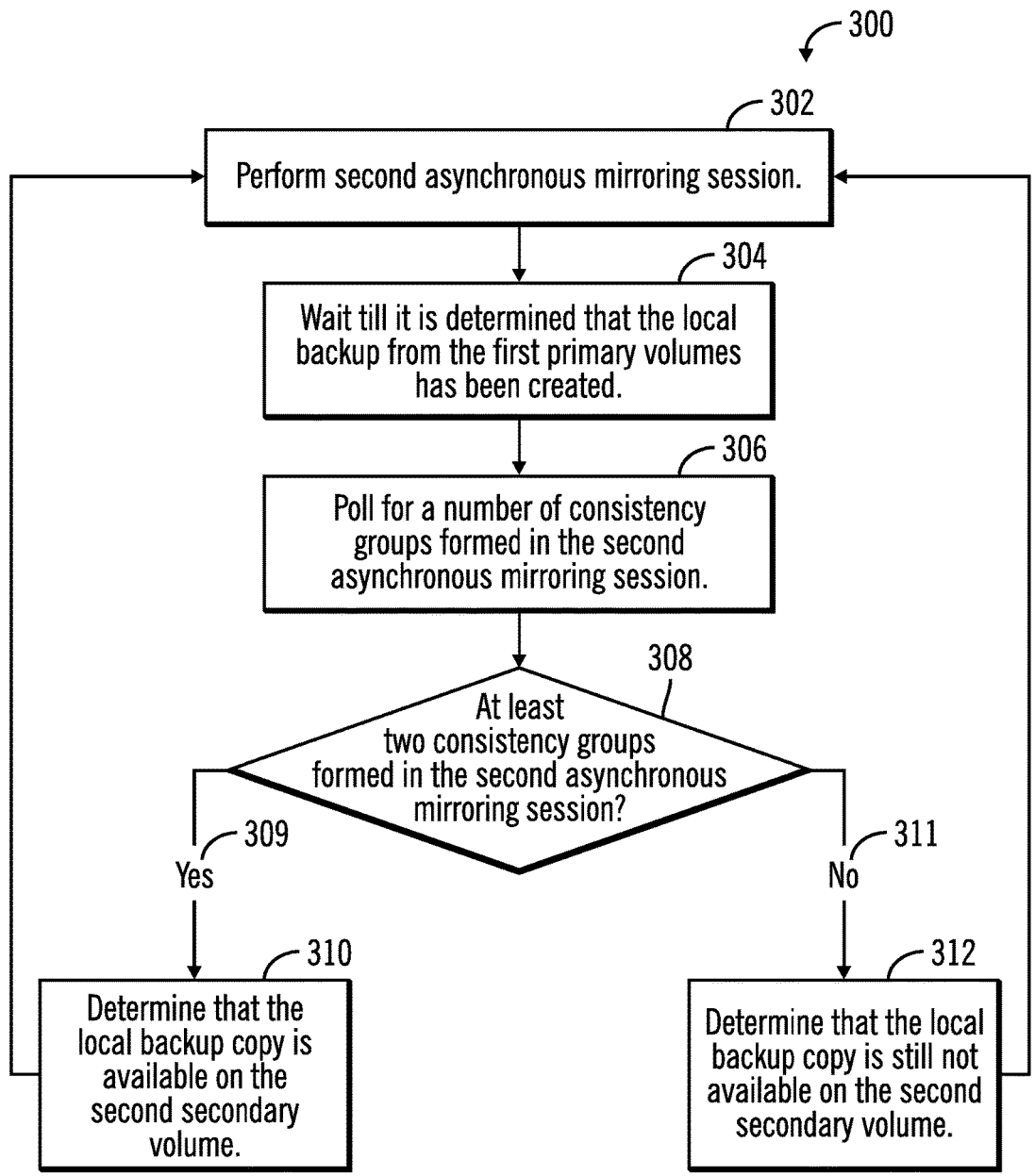
FIG. 3 illustrates a flowchart that shows certain operations for generating consistent copies during the second asynchronous mirroring session that performs asynchronous mirroring of the local backup, based on formation of at least two consistency groups, in accordance with certain embodiments.

FIG. 3 illustrates a flowchart 300 that shows certain operations for generating consistent copies during the second asynchronous mirroring session 110 that performs asynchronous mirroring of the local backup copy 112, based on formation of at least two consistency groups, in accordance with certain embodiments. The operations shown in FIG. 3 may be performed by one or more applications that execute in the local computational device 104 that may comprise a storage controller.

Control starts at block 302 in which the second asynchronous mirroring session 110 is being performed. A waiting is performed (at block 304) until it is determined that the local backup copy 112 from the first primary volumes 116 has been created. Control proceeds to block 306 in which polling is performed to determine the number of consistency groups formed in the second asynchronous mirroring session 110.

At block 308, a determination is made as to whether at least two consistency groups have been formed in the second asynchronous mirroring session 110. If so, ("Yes" branch 309), a determination is made (at block 310) that the local backup copy 112 is available on the second secondary volume 128. If not, ("No" branch 311), a determination is made (at block 312) that the local backup copy 112 is still not available on the second secondary volume 128. From block 310, 312 control returns to block 302 where the second asynchronous mirroring session 110 continues operations.

Therefore, FIG. 3 illustrates certain embodiments in which at least two consistency groups have to be formed in the second asynchronous mirroring session 110 to determine that at least part of the local backup copy 112 has been consistently copied to the remote site.

Figure 4:
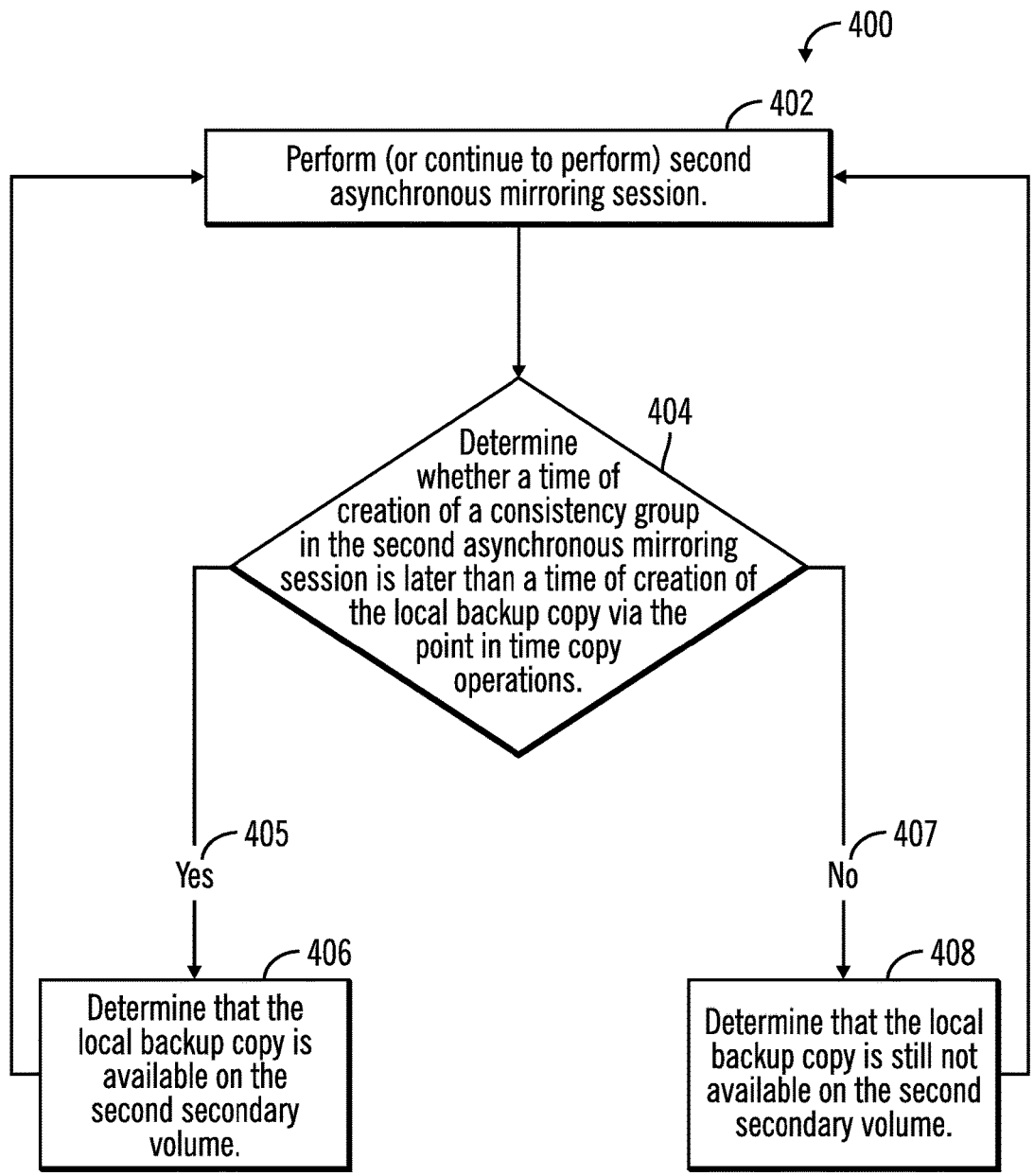
FIG. 4 illustrates a flowchart that shows certain operations for generating consistent copies during the second asynchronous mirroring session that performs asynchronous mirroring of the local backup, based on times of creation of a consistency group and the local backup copy, in accordance with certain embodiments.

FIG. 4 illustrates a flowchart 400 that shows certain operations for generating consistent copies during the second asynchronous mirroring session 110 that performs asynchronous mirroring of the local backup copy 112, based on times of creation of a consistency group and the local backup copy, in accordance with certain embodiments. The operations shown in FIG. 4 may be performed by one or more applications that execute in the local computational device 104 that may comprise a storage controller.

Control starts at block 402 in which the second asynchronous mirroring session 110 is being performed. Control proceeds to block 404 in which a determination is made as to whether a time of creation of a consistency group in the second asynchronous mirroring session 110 is later than a time of creation of the local backup copy 112 via the point in time copy operations 120. If so, ("Yes" branch 405), a determination is made (at block 406) that the local backup copy 112 is available on the second secondary volume 128. If not, ("No" branch 407), a determination is made (at block 408) that the local backup copy 112 is still not available on the second secondary volume 128. From blocks 406, 408 control returns to block 402 where the second asynchronous mirroring session 110 continues operations.

Therefore, FIG. 4 illustrates certain embodiments in which if the time of creation of a consistency group in the second asynchronous mirroring session is later than a time of creation of the local backup copy via the point in time copy, then it is determined that at least part of the local backup copy has been consistently copied to the remote site.

Therefore, FIGS. 1-4 illustrate certain embodiments in which an additional asynchronous mirroring session 110 is initiated to generate consistent copies of a local backup copy 112 at a remote site, while the local backup copy is being used by a user at the local site.

Embodiments in a Global Mirroring Environment

FlashCopy* (FLC) is a type of point in time copy in which nearly instantaneous point in time snapshot copies of entire logical volumes or data sets may be created, and Global Mirror* (GM) provides data replication over extended distances via asynchronous copying with recovery point objectives (RPO) of as low as 3-5 seconds or less (FlashCopy and Global Mirror are trademarks or registered trademarks of IBM corporation in many jurisdictions worldwide). Certain embodiments shown in FIGS. 1-4 are now shown in embodiments that are implemented in a computing environment that uses Global Mirror and FlashCopy.

* IBM, zSeries, pSeries, xSeries, BladeCenter, WebSphere, and DB2, Flash-Copy, Global Mirror, z/OS are trademarks or registered trademarks of International Business Machines Corporation in many jurisdictions worldwide.

Figure 5:
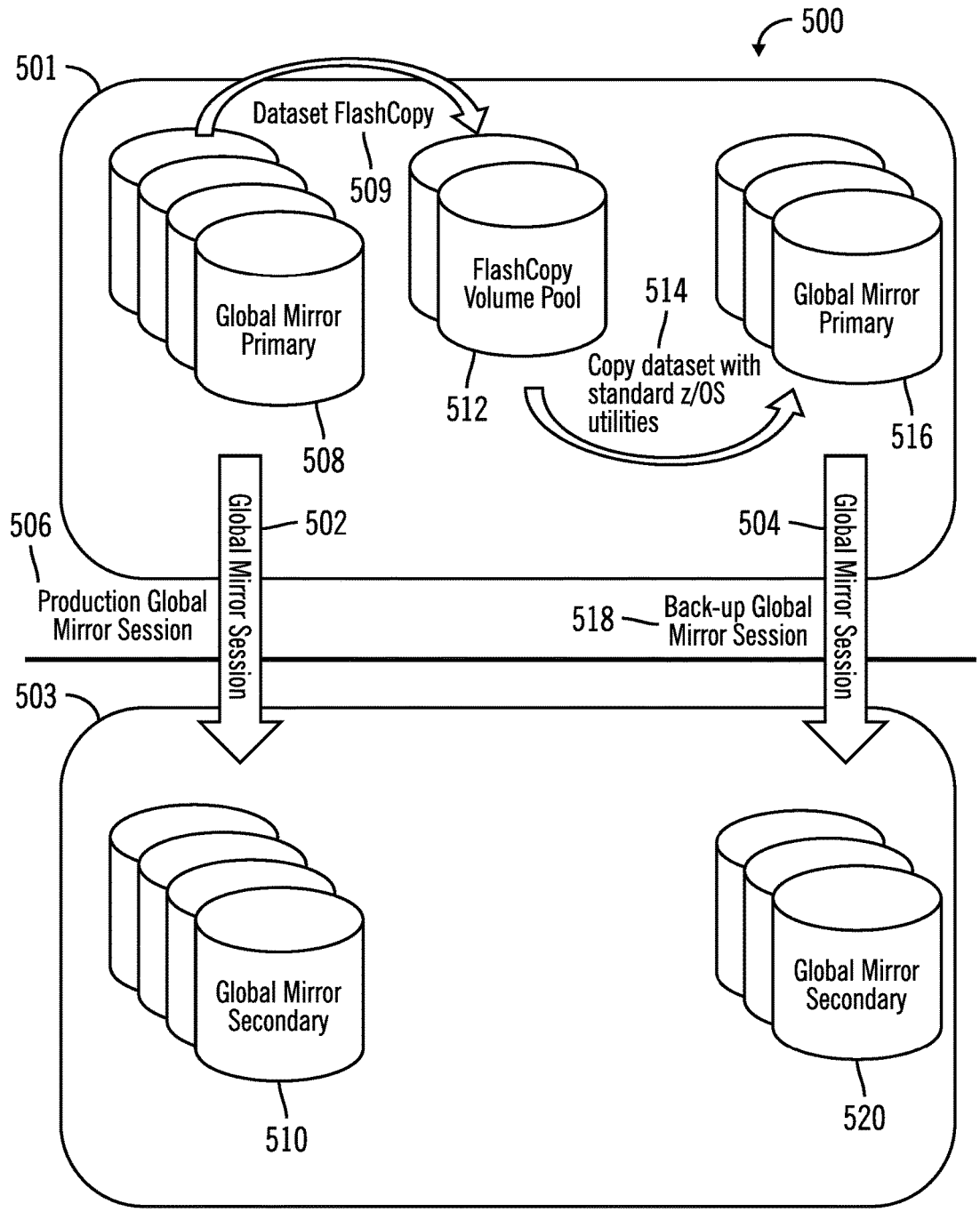
FIG. 5 illustrates a block diagram that shows a Global Mirroring environment in which two Global Mirroring sessions execute in parallel, in accordance with certain embodiments.

FIG. 5 illustrates a block diagram 500 that shows a Global Mirroring environment in which two Global Mirroring sessions 502, 504 execute in parallel, in accordance with certain embodiments. The first global mirror session is a production Global Mirror session 504 that copies Global Mirror primary volumes 508 maintained at a local site 501 to Global Mirror secondary volumes 510 maintained at a remote site 503.

FlashCopy operations 509 are performed to copy datasets from the Global Mirror primary volumes 508 to a FlashCopy volume pool 512. Datasets are copied (shown via reference numeral 514) from the FlashCopy volume pool 512 via standard operating system (e.g., z/OS*) utilities to generate the Global Mirror primary volumes 516 for the Global Mirror session 504 (also called a back-up Global Mirror session 518) that creates consistent copies in the Global Mirror secondary volumes 520 at the remote site 503.

Figure 6:
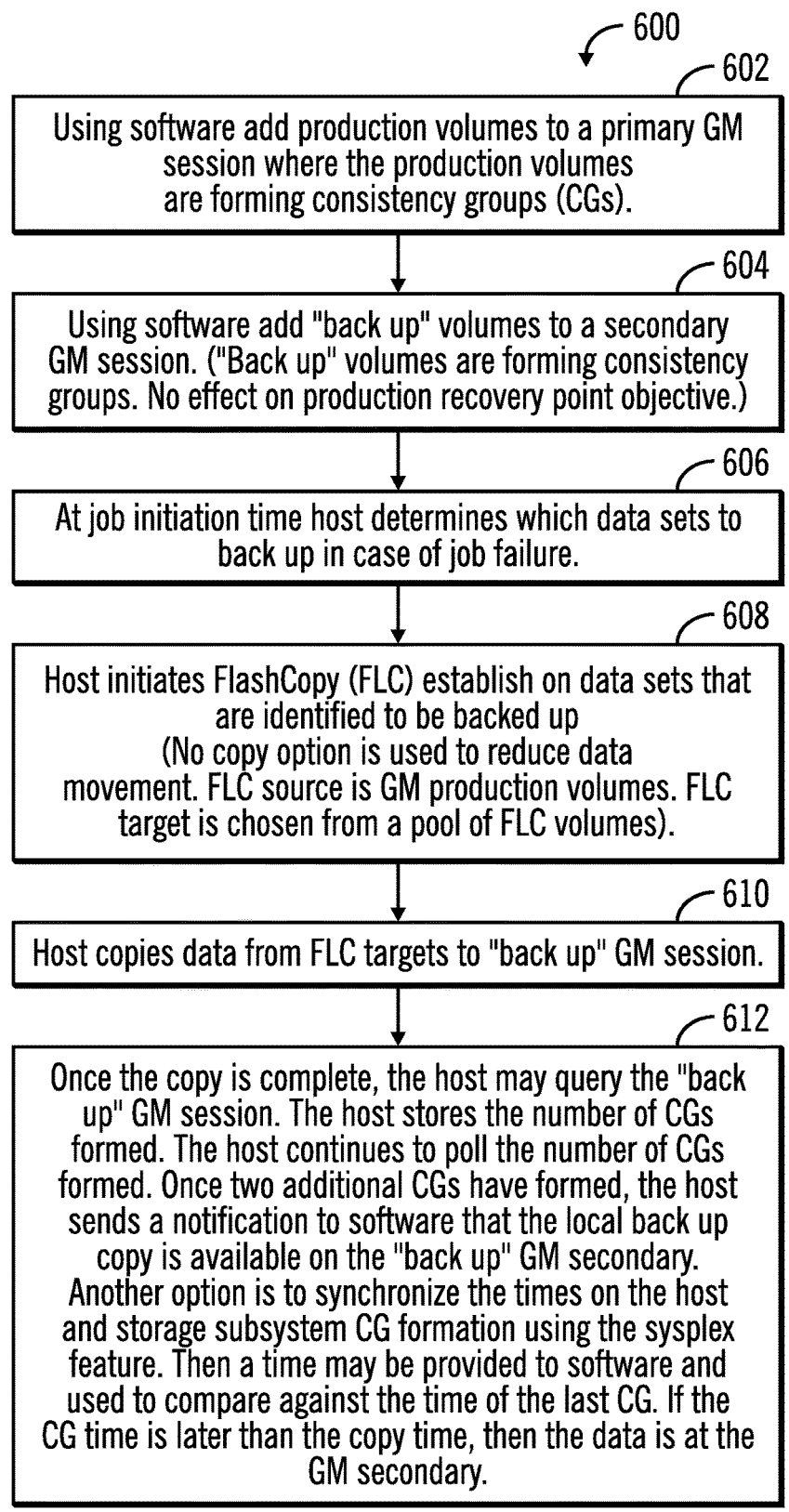
FIG. 6 illustrates a flowchart that shows operations performed in the Global Mirroring environment of FIG. 5, in accordance with certain embodiments.

FIG. 6 illustrates a flowchart 602 that shows operations performed in the Global Mirroring environment 500 of FIG. 5, in accordance with certain embodiments. The operations shown in FIG. 6 may be performed via operations shown below.

(1) Using software production volumes are added to a primary GM session 502. Production volumes are forming consistency groups (CGs) (reference numeral 602).

(2) Using software "back up" volumes are added to a second GM session 504. "Back up" volumes are forming consistency groups. There is no effect on production RPO (reference numeral 604).

(3) At job initiation time a host may determine which data sets to back up in case of job failure (reference numeral 606).

(4) Host initiates FLC establish on data sets identified in operation (3) above. A "No copy" option may be used to reduce data movement. FLC source is GM production volumes, and FLC target is chosen from a pool of FLC volumes (reference numeral 608).

(5) Host copies data from FLC targets to "back up" GM session (reference numeral 610).

(6) Once the copy is complete, the host may query the "back up" GM session. The host stores the number of CGs formed. The host continues to poll the number of CGs formed. Once two additional CGs have formed, the host sends a notification to software that the local back up copy is available on the "back up" GM secondary. Another option here is to synchronize the times on the host and storage subsystem CG formation using the sysplex feature. Then a time may be provided to software and used to compare against the time of the last CG. If the CG time is later than the copy time, then the data is at the GM secondary (reference numeral 610).

Therefore, FIGS. 5-6 illustrate certain embodiments implemented in a Global Mirror environment in which FlashCopy is used such that an additional asynchronous mirroring session is initiated to generate consistent copies of a local backup copy at a remote site, while the local backup copy is being used by a user at the local site.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
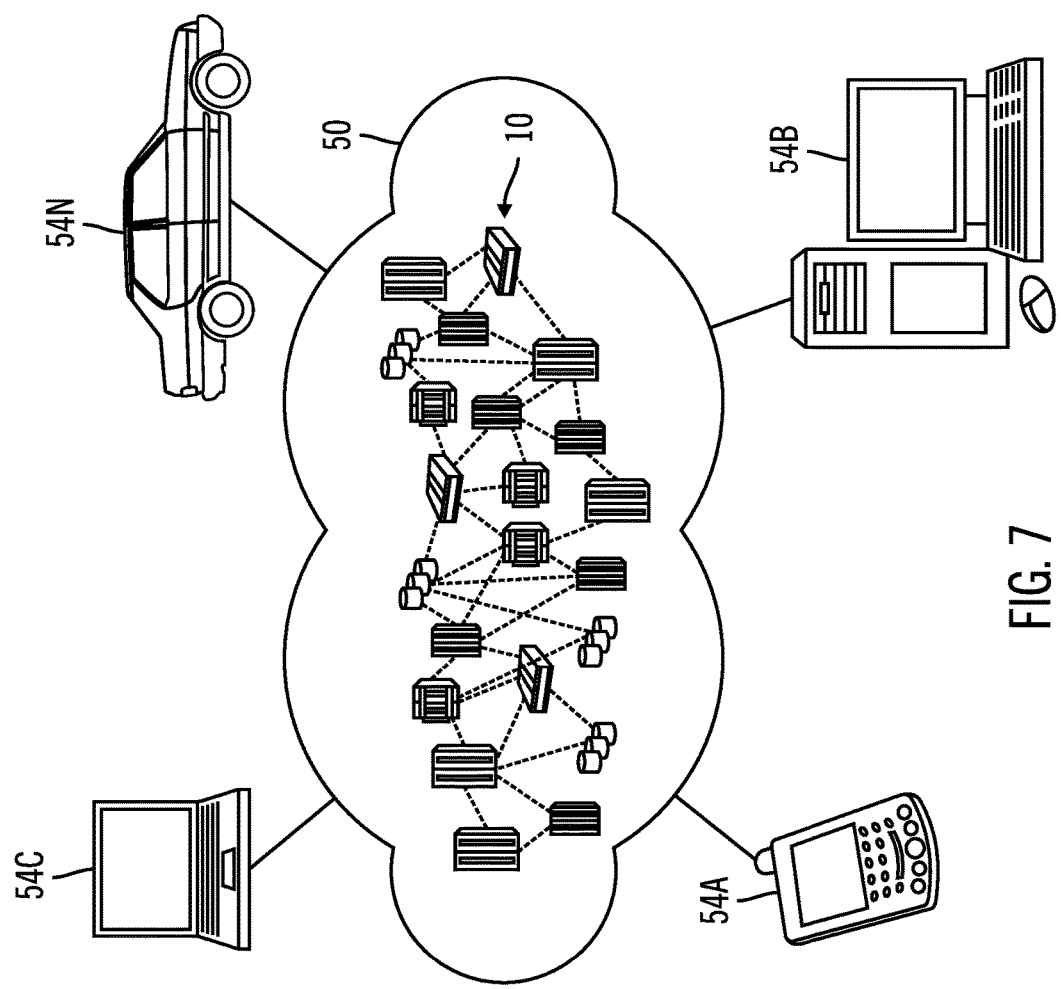
FIG. 7 illustrates a block diagram of a cloud computing environment, in accordance with certain embodiments.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
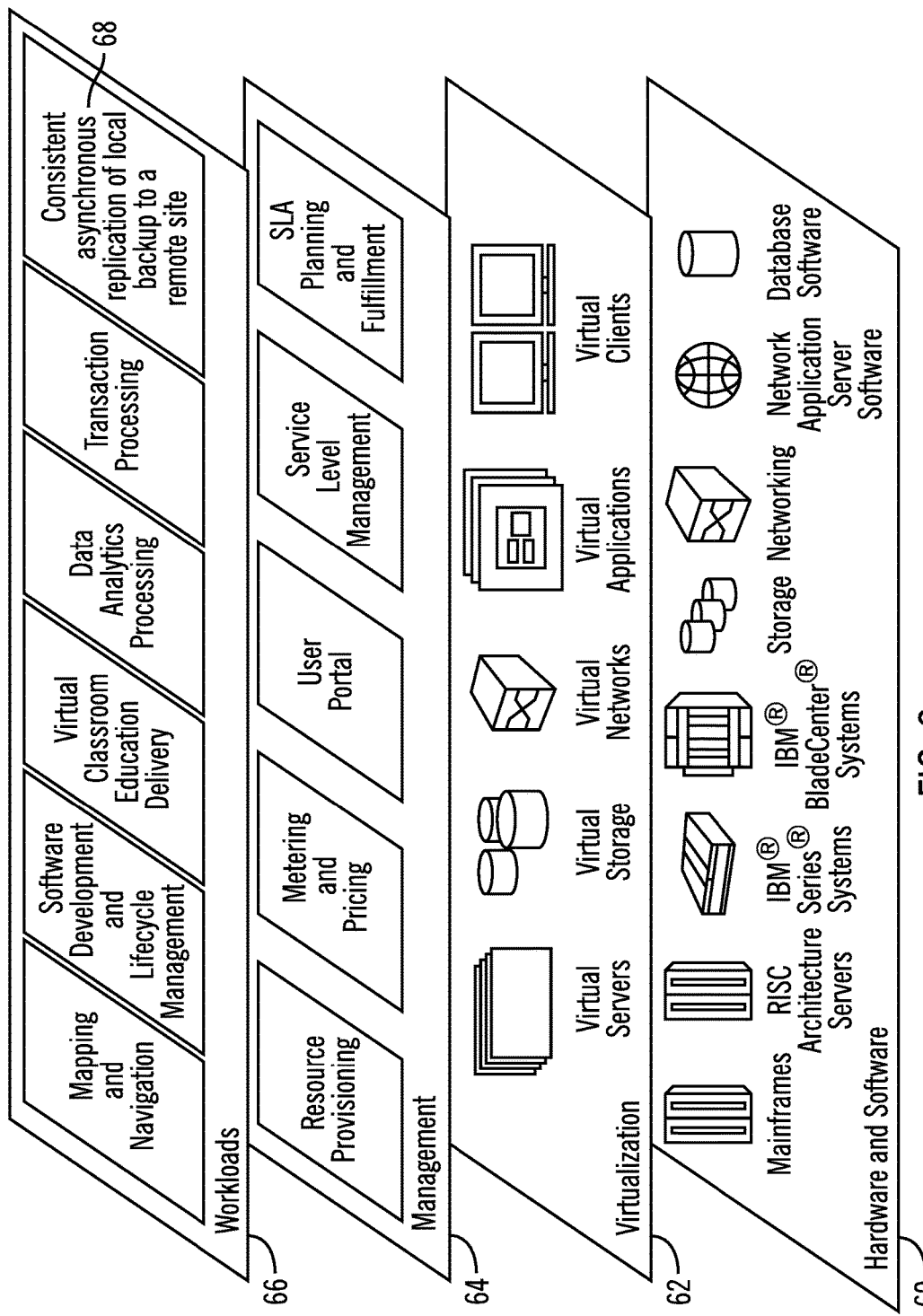
FIG. 8 illustrates a block diagram of further details of the cloud computing environment of FIG. 7, in accordance with certain embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized.

Examples of workloads and functions which may be provided from this layer include: mapping and navigation; software development and lifecycle management; virtual classroom education delivery; data analytics processing; transaction processing; and the processes for consistent asynchronous replication of local backup to a remote site 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
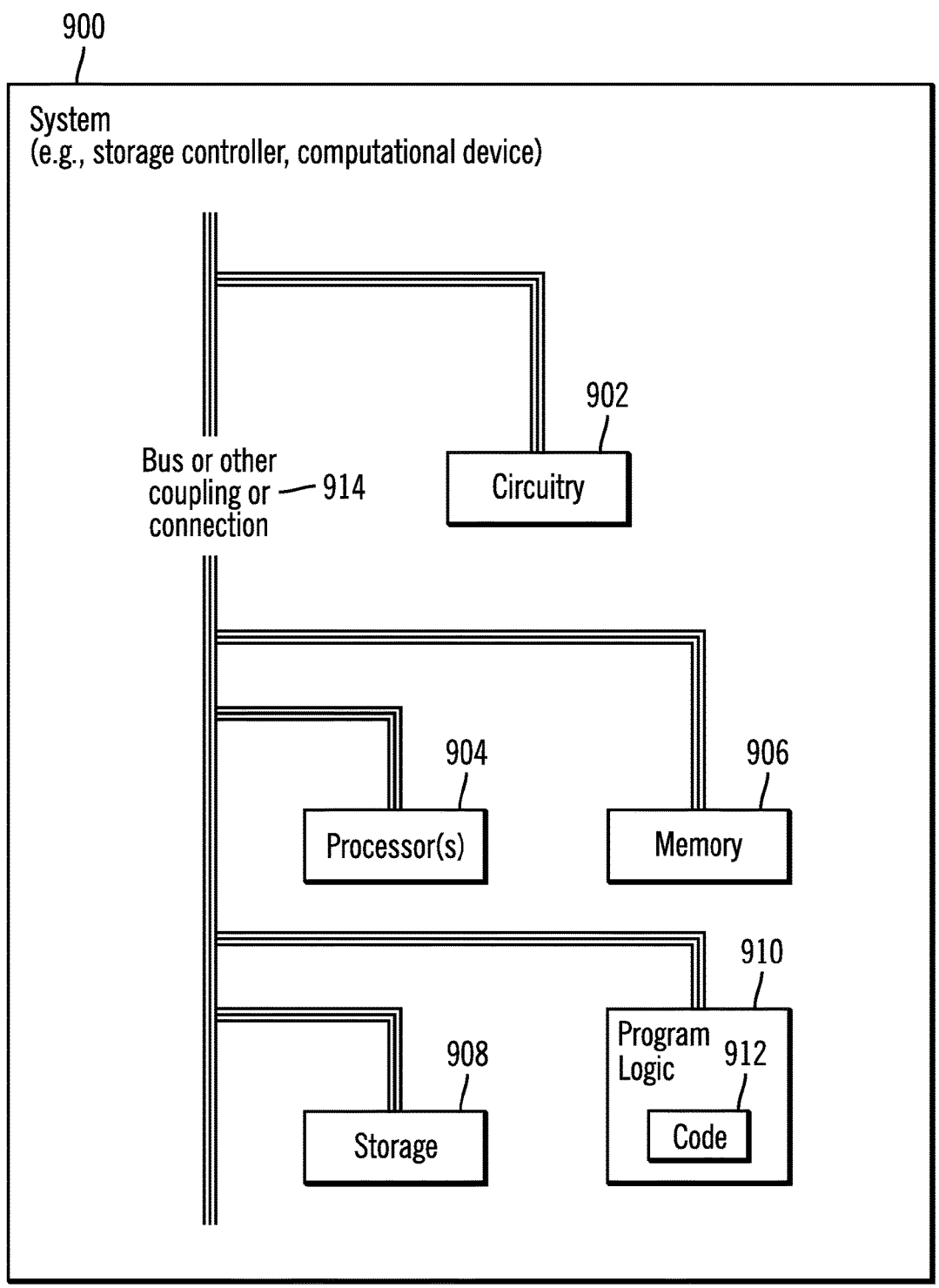
FIG. 9 illustrates a block diagram of a computational system that shows certain elements that may be included in the computational devices shown in FIGS. 1 and 5 in accordance with certain embodiments.

FIG. 9 illustrates a block diagram that shows certain elements that may be included in the local computational device 104, the remote computational device 106, the hosts 102, or any computational device used in FIGS. 1-8. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. One or more of the components in the system 900 may communicate via a bus or via other coupling or connection 914. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   initiating a first asynchronous mirroring session to asynchronously copy first primary volumes to first secondary volumes;
   in response to receiving, by a storage controller at a local site, a request from a user via a host to create a local backup copy of selected data sets of the first primary volumes, generating by the storage controller at the local site, via point in time copy operations, the local backup copy of the selected data sets of the first primary volumes requested by the user from the first primary volumes, wherein a job of the user is executed by using the local backup copy of the selected data sets of the first primary volumes while the first primary volumes are being asynchronously copied to the first secondary volume via the first asynchronous mirroring session;

generating, second primary volumes from the local backup copy of the selected data sets of the first primary volumes; and initiating, a second asynchronous mirroring session to asynchronously copy the second primary volumes to second secondary volumes.

2. The method of claim 1, wherein:

the first primary volumes and the second primary volumes are maintained at the local site;

the first secondary volumes and the second secondary volumes are maintained at a remote site;

the local backup copy is maintained at the local site;

the first asynchronous mirroring session copies the second primary volumes consistently to the second secondary volumes, and the second asynchronous mirroring session copies the second primary volumes consistently to the second secondary volumes; and the first asynchronous mirroring session and the second asynchronous mirroring session execute operations in parallel.

3. The method of claim 1, the method further comprising:

in response to determining that the local backup copy from the first primary volumes has been created, polling for a number of consistency groups formed in the second asynchronous mirroring session; and in response to at least two consistency groups being formed in the second asynchronous mirroring session, determining that the local backup copy is available on the second secondary volumes.

4. The method of claim 1, the method further comprising:

in response to determining that a time of creation of a consistency group in the second asynchronous mirroring session is later than a time of creation of the local backup copy via the point in time copy operations, determining that the local backup copy is available on the second secondary volumes.

5. The method of claim 1, wherein:

the first asynchronous mirroring session asynchronously copies first primary volumes stored at the local site to a remote site into first secondary volumes;

the second asynchronous mirroring session asynchronously copies second primary volumes stored at the local site to the remote site into second secondary volumes; and one or more applications use the local backup copy for performing operations at the local site.

6. The method of claim 1, wherein:

changes made by the job to the local backup copy of the selected data sets of the first primary volumes are nor reflected in the first secondary volumes being generated by the first asynchronous mirroring session; and the local backup copy of the selected data sets of the first primary volumes that undergo changes made by the job are replicated consistently to second secondary volumes.

7. A system coupled to a host, the system comprising:

a memory; and a processor coupled to the memory, wherein the processor performs operations, the operations comprising:

initiating a first asynchronous mirroring session to asynchronously copy first primary volumes to first secondary volumes;

in response to receiving, a request from a user via the host to create a local backup copy of selected data sets of the first primary volumes, generating, via point in time copy operations, the local backup copy of the selected data sets of the first primary volumes requested by the user from the first primary volumes, wherein a job of the user is executed by using the local backup copy of the selected data sets of the first primary volumes while the first primary volumes are being asynchronously copied to the first secondary volume via the first asynchronous mirroring session;

generating, second primary volumes from the local backup copy of the selected data sets of the first primary volumes; and initiating, a second asynchronous mirroring session to asynchronously copy the second primary volumes to second secondary volumes.

8. The system of claim 7, wherein:

the first primary volumes and the second primary volumes are maintained at a local site;

the first secondary volumes and the second secondary volumes are maintained at a remote site;

the local backup copy is maintained at the local site;

the first asynchronous mirroring session copies the second primary volumes consistently to the second secondary volumes, and the second asynchronous mirroring session copies the second primary volumes consistently to the second secondary volumes; and the first asynchronous mirroring session and the second asynchronous mirroring session execute operations in parallel.

9. The system of claim 7, the operations further comprising:

in response to determining that the local backup copy from the first primary volumes has been created, polling for a number of consistency groups formed in the second asynchronous mirroring session; and in response to at least two consistency groups being formed in the second asynchronous mirroring session, determining that the local backup copy is available on the second secondary volumes.

10. The system of claim 7, the operations further comprising:

in response to determining that a time of creation of a consistency group in the second asynchronous mirroring session is later than a time of creation of the local backup copy via the point in time copy operations, determining that the local backup copy is available on the second secondary volumes.

11. The system of claim 7, wherein:

the first asynchronous mirroring session asynchronously copies first primary volumes stored at a local site to a remote site into first secondary volumes;

the second asynchronous mirroring session asynchronously copies second primary volumes stored at the local site to the remote site into second secondary volumes; and one or more applications use the local backup copy for performing operations at the local site.

12. The system of claim 7, wherein:

changes made by the job to the local backup copy of the selected data sets of the first primary volumes are nor reflected in the first secondary volumes being generated by the first asynchronous mirroring session; and the local backup copy of the selected data sets of the first primary volumes that undergo changes made by the job are replicated consistently to second secondary volumes.

13. A computer program product, the computer program product comprising:

a computer readable storage medium having computer readable program code embodied therewith, the computer readable program code configured to perform operations, the operations comprising:

initiating a first asynchronous mirroring session to asynchronously copy first primary volumes to first secondary volumes;

in response to receiving, by a storage controller at a local site, a request from a user via a host to create a local backup copy of selected data sets of the first primary volumes, generating by the storage controller at the local site, via point in time copy operations, the local backup copy of the selected data sets of the first primary volumes requested by the user from the first primary volumes, wherein a job of the user is executed by using the local backup copy of the selected data sets of the first primary volumes while the first primary volumes are being asynchronously copied to the first secondary volume via the first asynchronous mirroring session;

generating, second primary volumes from the local backup copy of the selected data sets of the first primary volumes; and initiating, a second asynchronous mirroring session to asynchronously copy the second primary volumes to second secondary volumes.

14. The computer program product of claim 13, wherein:

the first primary volumes and the second primary volumes are maintained at the local site;

the first secondary volumes and the second secondary volumes are maintained at a remote site;

the local backup copy is maintained at the local site;

the first asynchronous mirroring session copies the second primary volumes consistently to the second secondary volumes, and the second asynchronous mirroring session copies the second primary volumes consistently to the second secondary volumes; and the first asynchronous mirroring session and the second asynchronous mirroring session execute operations in parallel.

15. The computer program product of claim 13, the operations further comprising:

in response to determining that the local backup copy from the first primary volumes has been created, polling for a number of consistency groups formed in the second asynchronous mirroring session; and in response to at least two consistency groups being formed in the second asynchronous mirroring session, determining that the local backup copy is available on the second secondary volumes.

16. The computer program product of claim 13, the operations further comprising:

in response to determining that a time of creation of a consistency group in the second asynchronous mirroring session is later than a time of creation of the local backup copy via the point in time copy operations, determining that the local backup copy is available on the second secondary volumes.

17. The computer program product of claim 13, wherein:

the first asynchronous mirroring session asynchronously copies first primary volumes stored at the local site to a remote site into first secondary volumes;

the second asynchronous mirroring session asynchronously copies second primary volumes stored at the local site to the remote site into second secondary volumes; and one or more applications use the local backup copy for performing operations at the local site.

18. The computer program product of claim 13, wherein:

changes made by the job to the local backup copy of the selected data sets of the first primary volumes are nor reflected in the first secondary volumes being generated by the first asynchronous mirroring session; and the local backup copy of the selected data sets of the first primary volumes that undergo changes made by the job are replicated consistently to second secondary volumes.

* * * * *